(12) United States Patent
Haibel

(10) Patent No.: US 8,596,697 B1
(45) Date of Patent: Dec. 3, 2013

(54) ACTUATED BREACH LOCK

(75) Inventor: Joshua A. Haibel, Louisville, KY (US)

(73) Assignee: Sypris Technologies, Inc., Louisville, KY (US)

( * ) Notice: Subject to any disclaimer, the term of this patent is extended or adjusted under 35 U.S.C. 154(b) by 1053 days.

(21) Appl. No.: 12/580,925

(22) Filed: Oct. 16, 2009

(51) Int. Cl.
*B65D 45/00* (2006.01)
*B65D 45/30* (2006.01)

(52) U.S. Cl.
USPC .................. 292/256; 292/256.5; 292/256.6; 220/298

(58) Field of Classification Search
USPC .................. 292/256, 256.5, 256.6; 220/298
See application file for complete search history.

(56) References Cited

U.S. PATENT DOCUMENTS

| | | | |
|---|---|---|---|
| 631,292 A | 8/1899 | Fyfe et al. | |
| 853,825 A | 5/1907 | Pascoe | |
| 995,007 A | 6/1911 | Hunter | |
| 997,771 A | 7/1911 | Fish | |
| 997,793 A | 7/1911 | Fish et al. | |
| 1,056,015 A | 3/1913 | Fish | |
| 1,113,507 A | 10/1914 | Thompson | |
| 1,118,436 A | 11/1914 | Mosler et al. | |
| 1,136,254 A * | 4/1915 | Mosler et al. | 70/118 |
| 1,144,683 A * | 6/1915 | Barder | 220/298 |
| 1,158,884 A * | 11/1915 | Barraja et al. | 114/238 |
| 1,180,256 A | 4/1916 | Cary | |
| 1,197,702 A | 9/1916 | Williams | |
| 1,226,766 A | 5/1917 | Gammeter | |
| 1,311,009 A | 7/1919 | Rinehimer | |
| RE15,181 E | 8/1921 | Kenneweg | |
| 1,465,906 A | 8/1923 | Polloway | |
| 1,501,958 A | 7/1924 | Mackie | |
| 1,565,645 A | 12/1925 | Hills | |
| 1,603,903 A | 10/1926 | Church | |
| 1,663,755 A * | 3/1928 | Gammeter | 220/298 |
| 1,688,570 A | 10/1928 | Williams | |

(Continued)

FOREIGN PATENT DOCUMENTS

DE 911565 5/1954

*Primary Examiner* — Carlos Lugo
(74) *Attorney, Agent, or Firm* — Middleton Reutlinger; John F. Salazar; James E. Cole

(57) ABSTRACT

An actuated breach lock, comprises a hub for positioning on a pressurizable vessel, the hub being generally circular and having a central opening, a bearing surface disposed within the central opening, a head hingedly connected to the hub and having a shape which complements the central opening and which is received within the central opening, the hub having a plurality of teeth extending radially inward and separated by a plurality of gaps, a locking ring rotatably positioned on the head, the locking ring having a plurality of ring teeth separated by a plurality of ring gaps, each of the teeth having a circumferential length less than a circumferential length of the gaps in the hub, the bearing surface of the hub having an angle and the head having a bearing surface at the angle, the locking ring having a polygonal cross-section including two sides which engage the bearing surfaces respectively, the locking ring engaged by head and hub when the head is in a closed position, the closed position creating a line of force which is aligned from the head through the ring and to the hub, an actuator assembly disposed radially inwardly of the locking ring, the actuator assembly engaging the locking ring and causing rotation of locking between one of a first locked and unlocked position and the other of the locked and unlocked position, the locking ring in compression when the head is closed and having a line of force being substantially aligned from the hub through the head.

20 Claims, 10 Drawing Sheets

(56) References Cited

U.S. PATENT DOCUMENTS

| | | | |
|---|---|---|---|
| 1,727,595 A * | 9/1929 | Gustafson | 114/178 |
| 1,833,208 A | 11/1931 | Davidson | |
| 2,044,276 A | 6/1936 | Bukolt | |
| 2,225,448 A | 12/1940 | Hamilton | |
| 2,583,073 A * | 1/1952 | Ahlborn | 220/291 |
| 2,583,085 A | 1/1952 | Campbell | |
| 2,602,198 A * | 7/1952 | Parker | 49/463 |
| 2,660,330 A * | 11/1953 | Keller | 220/298 |
| 2,835,404 A | 5/1958 | Andrus | |
| 2,916,143 A | 12/1959 | McConalogue | |
| 3,107,810 A * | 10/1963 | King | 220/316 |
| 3,139,047 A | 6/1964 | Maynard | |
| 3,303,961 A | 2/1967 | Witherspoon et al. | |
| 3,531,011 A | 9/1970 | Wolfe | |
| 3,653,533 A | 4/1972 | Mortensen | |
| 3,655,090 A | 4/1972 | Rothrock et al. | |
| 3,804,288 A * | 4/1974 | Piegza | 220/320 |
| 4,434,909 A * | 3/1984 | Ott | 220/316 |
| 4,466,551 A | 8/1984 | Leung | |
| 4,478,350 A | 10/1984 | Ohlsson | |
| 5,700,043 A * | 12/1997 | Rohard et al. | 292/256.6 |
| 6,534,712 B1 | 3/2003 | Pitrone et al. | |
| 8,365,938 B2 * | 2/2013 | Ohlson | 220/4.21 |

\* cited by examiner

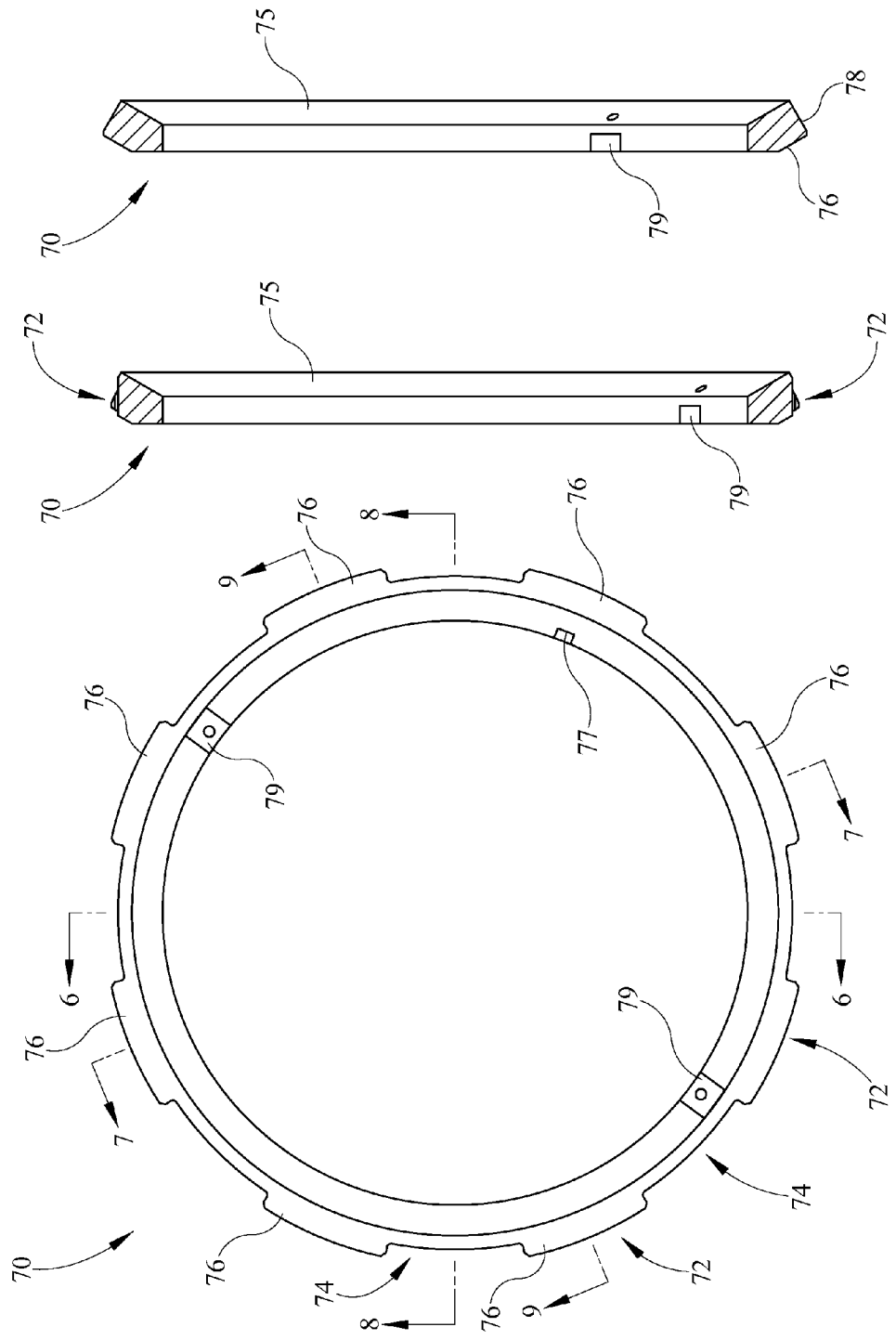

ACTUATED BREACH LOCK

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates to a closure for a pressure vessel and more specifically relates to an actuated breach lock closure for a pressure vessel.

2. Description of the Related Art

Prior art closures typically utilize large heavy-duty rotatable closure elements in order to open and close access to pressurized vessels for, as an example, cleaning. The rotatable elements are typically either the door or an outer ring rotating about the frame. Since these are such large rigid elements, they are typically very heavy. Thus, actuating components must generate a large force in order to properly actuate movement for these parts. This results in high cost, high energy consumption, and difficulty in providing functionality.

The rotatable elements must be engineered as large elements in order to carry large loadings associated with pressurized systems. The closures include a frame and a door which are typically round and have a primary axis about which the frame extends circumferentially. When the door is in the closed position, the primary axis passes through the door, which is co-axial with the frame. Locking components for the closure typically include a planar surface which is perpendicular to the primary axis of the closure. Since these locking components may carry non-aligned loadings in different areas, the load bearing elements or components are subjected to large bending forces. Thus, the rotatable elements must be designed to withstand these large bending forces. This also results in larger, heavier parts than would otherwise be necessary.

Some closures utilize locking rings which are deformable in order to extend into or retract from an internal annular cavity in the door frame. This allows movement of the locking ring into or out of the cavity during locking or unlocking of the closure. However, the deformability of the ring causes the ring to bind between the door and frame when the ring is beginning to engage the internal cavity therefore inhibiting unlocking and opening. Repeated locking and unlocking of the closure is therefore inhibited, especially when contaminants or corrosion develops on sliding surfaces.

Given the foregoing, it will be appreciated that a closure for a pressure vessel is desired which inhibits bending moment about a locking ring, which inhibits binding of the locking ring and allows rotation of lightest portion of the closure assembly for locking and unlocking.

SUMMARY OF THE INVENTION

An actuated breach lock, comprises a hub for positioning on a pressurizable vessel, the hub being generally circular and having a central opening, a bearing surface disposed within the central opening, a head hingedly connected to the hub and having a shape which complements the central opening and which is received within the central opening, the hub having a plurality of teeth extending radially inward and separated by a plurality of gaps, a locking ring rotatably positioned on the head, the locking ring having a plurality of ring teeth separated by a plurality of ring gaps, each of the teeth having a circumferential length less than a circumferential length of the gaps in the hub, the bearing surface of the hub having an angle and the head having a bearing surface at the angle, the locking ring having a polygonal cross-section including two sides which engage the bearing surfaces respectively, the locking ring engaged by head and hub when the head is in a closed position, the closed position creating a line of force which is aligned from the head through the ring and to the hub, an actuator assembly disposed radially inwardly of the locking ring, the actuator assembly engaging the locking ring and causing rotation of locking between one of a first locked and unlocked position and the other of the locked and unlocked position, the locking ring in compression when the head is closed and having a line of force being substantially aligned from the hub through the head. The actuated breach lock wherein the actuator assembly has at least one actuator causing rotation of the locking ring relative to at least one of the head and the hub. The actuated breach lock wherein the at least one actuator comprises a first actuator and a second actuator, each of the first actuator and the second actuator being selected from the group consisting of pneumatic cylinders, hydraulic cylinders, linear actuators or motorized actuators. The actuated breach lock wherein the at least one actuator is positioned near the outer surface of the head. The actuated breach lock wherein the locking ring is rotated from a first position allowing the ring teeth to pass through the gaps in the hub, to a second position wherein the ring teeth engage the plurality of teeth of the hub. The actuated breach lock wherein the line of force inhibits moment and bending along the ring.

An actuated beach lock comprises a hub for closing and opening of a pressurized vessel, the hub having a central opening defined by a peripheral rim having circumferential edges, a first plurality of teeth extending radially inwardly from the rim, each of the first teeth separated by a first gap, a head pivotally connected to the hub for movement between an open position and a closed position, a polygonally shaped ring having a first surface and a second surface substantially parallel to the first surface, the first surface of the ring disposed against internal bearing surfaces of the first plurality of teeth of the hub, the second surface of the ring bearing against the head, the ring slidably rotatable about the head within the circumferential edges of the hub, the ring having a second plurality of teeth each of which fits within the first gap, the second plurality of teeth having one of the first surface and the second surface of the ring, the internal bearing surface of the hub and the external bearing surface of the head being disposed at parallel angles, and, a line of force being created when the closure is pressurized and which is substantially aligned through the head, the hub and the ring, the substantially aligned line of force inhibiting creation of bending of the ring. The actuated breach lock further comprising at least one actuator for rotating the ring relative to the head and the hub. The actuated breach lock further comprising a first actuator for rotating the ring in a first direction and a second actuator for rotating the ring in a second direction. The actuated breach lock wherein the first and second actuators are disposed on an outer surface of the head. The actuated breach lock wherein the ring is compressed between the hub and the head when the head is closed relative to the hub creating the line of force and inhibiting bending of the ring. The actuated breach lock wherein each of the second plurality of teeth on the ring are spaced apart by a second gap, the second gap having a circumferential length which is slightly greater than a circumferential length of the first plurality of teeth of the hub. The actuated breach lock wherein the second plurality teeth of the ring passes through the gaps of the hub, and the ring is rotated to lock the head in a closed position within the hub.

An actuated breach lock comprises a hub having a peripheral rim and a central opening, an interior bearing surface of the hub disposed at an angle to a major axis of the hub, a head, pivotally connected to the hub, the head being received by the central opening in the hub, the head further comprising an axially outward facing bearing surface disposed at an angle to the major axis, the hub having a first plurality of teeth extending radially inward from a peripheral edge, each of the first plurality of teeth spaced apart by a first gap, a ring rotatably positioned on the bearing surface of the head, the ring having a second plurality of teeth radially extending from a peripheral edge of the ring, each of the second plurality of teeth spaced apart by a second gap, the ring having at least one first position wherein at least one of the second plurality of teeth is aligned with the second gap and at least one of the second plurality of teeth is aligned with the first gap so that the ring and the head move into or out of the central opening of the hub, the ring having a first ring bearing surface and a second ring bearing surface, the first ring bearing surface engaging one of the hub interior bearing surface or the head bearing surface and the second ring bearing surface engaging the other of the hub interior bearing surface and the head bearing surface, the angle of the hub interior bearing surface, the head bearing surface and the first and second ring bearing surfaces allowing for a line of action substantially aligned through the head, the substantially aligned line of action inhibiting bending within the ring. The actuated breach lock further comprising a first actuator and a second actuator. The actuated breach lock wherein the first actuator rotates the ring in a first direction to lock the head and the second actuator rotates the ring in a second direction to unlock the head. The actuated breach lock wherein the first and second actuators being positioned on an external side of the head. The actuated breach lock wherein the ring is rotatable along an interior surface of the hub to lock or unlock the head. The actuated breach lock wherein the ring has a polygonal cross-sectional shape.

An actuated breach lock comprises a hub defined by a substantially circular body having a central aperture, a head pivotally connected to the hub and movable from a first position closing the central opening to a second position opening the central opening, a locking ring disposed on a surface of the head and engaging a groove in the hub when the head is in the first position, the head having a head contact surface which engages the locking ring and the hub having a hub contact surface which engages the locking ring when the head is in the first position, the locking ring having two contact surfaces, an interior contact surface and an exterior contact surface, the interior contact surface slidably contacting the head contact surface, whereas the exterior contact surface of the locking ring makes contact with the hub contact surface, wherein each of the contact surfaces of the locking ring are geometrically defined as a conical frustum, and further wherein the interior and exterior contact surfaces share a common conical angle and common axis of revolution, an interior contact surface conical radius being less than an exterior contact surface conical radius.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 5 depicts a front view of a locking ring;

FIG. 6 depicts a first cross-sectional view of the locking ring of FIG. 5;

FIG. 7 depicts a second cross-sectional view of the locking ring of FIG. 5;

DETAILED DESCRIPTION

Figure 1:
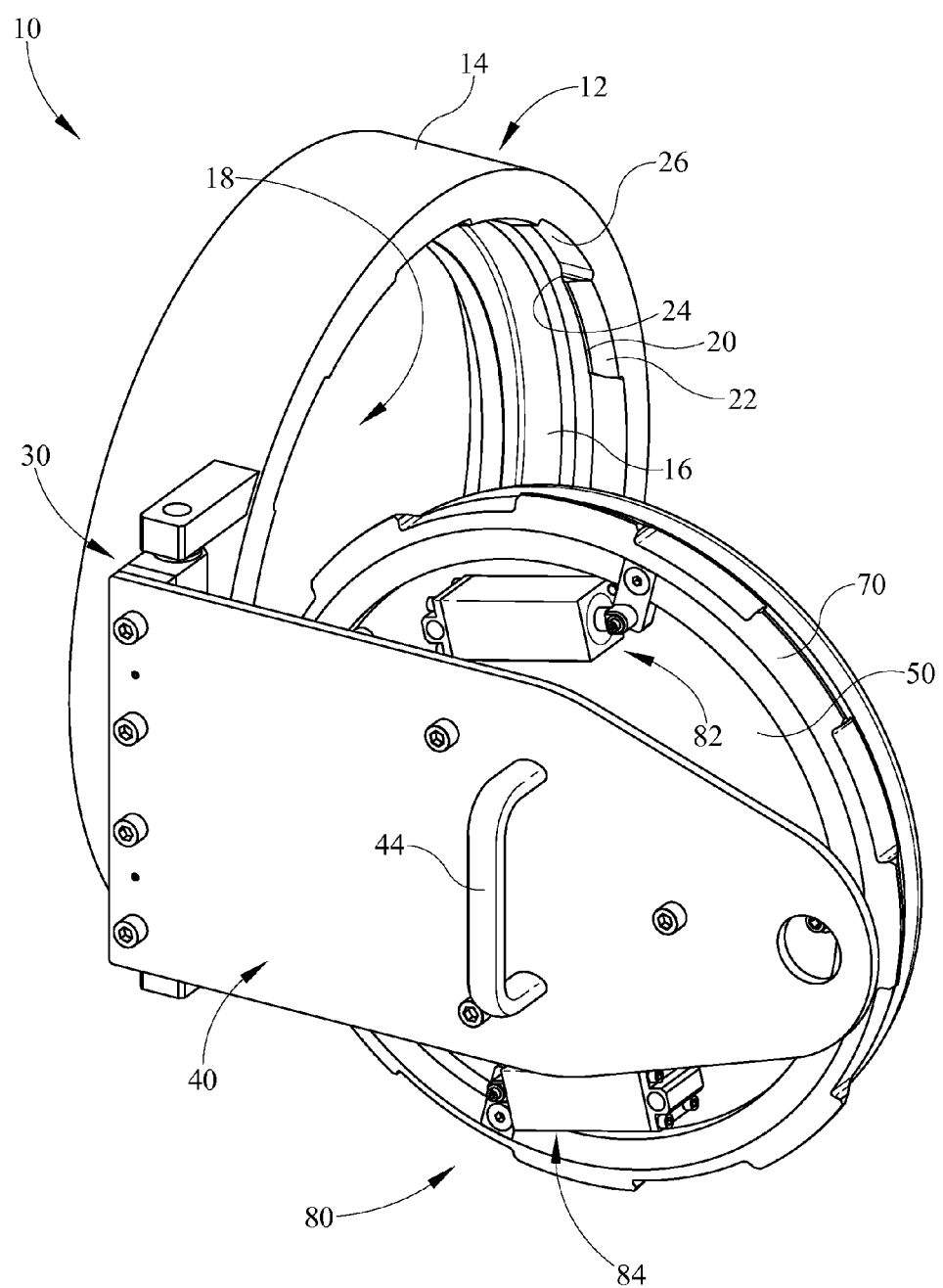
FIG. 1 depicts a perspective view of an actuated breach lock.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

With reference now to FIGS. 1-12, an actuated breach lock is depicted in various views. The actuated breach lock is used to access or close pressurized vessels, in a safe, repeatable manner.

Figure 2:
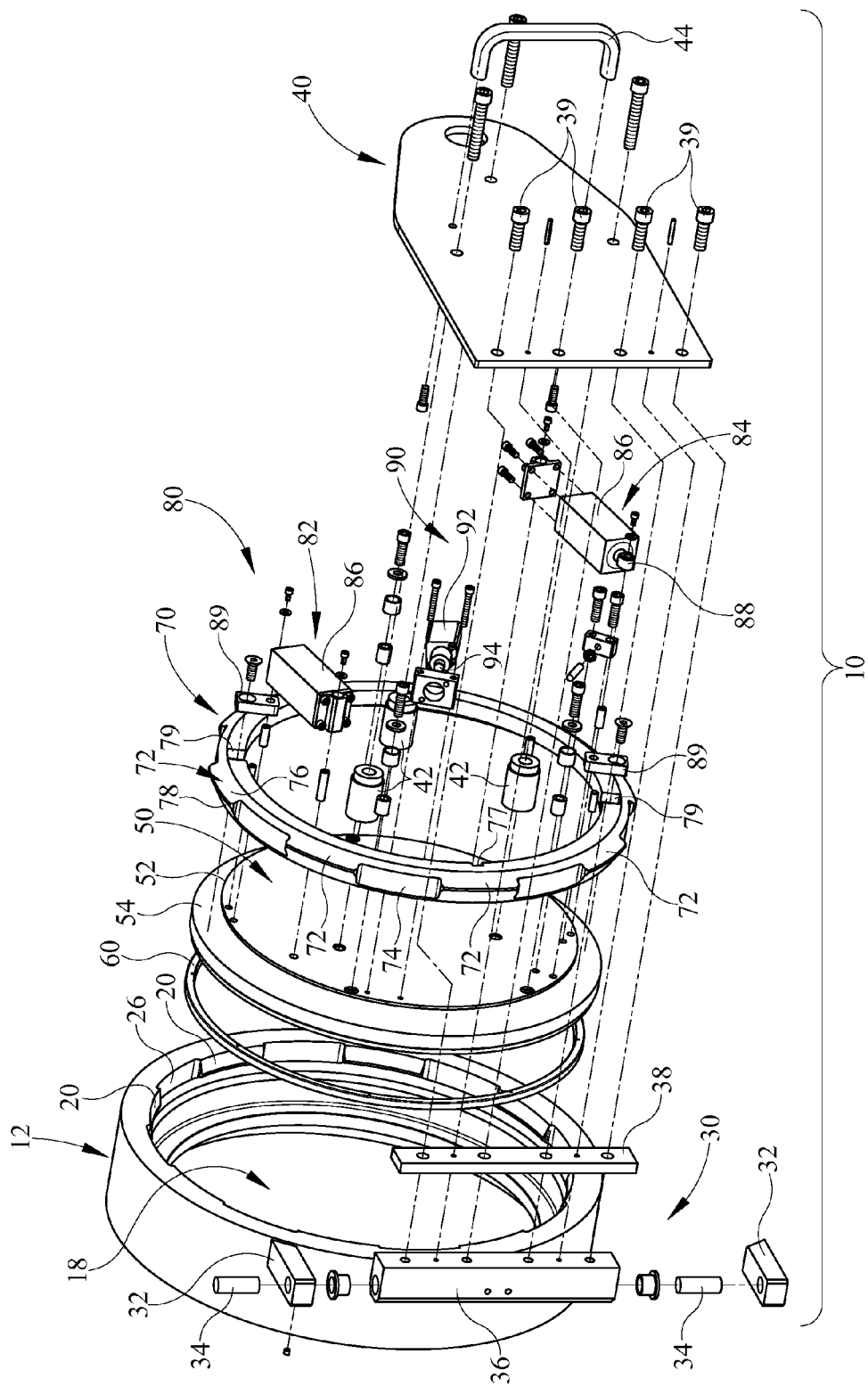
FIG. 2 depicts an exploded perspective view of the actuated breach lock of FIG. 1.

Referring initially to FIGS. 1 and 2, an assembled perspective view and an exploded perspective view of a closure 10 are depicted. The closure 10 includes a hub 12 which is connected to a pressure vessel in order to access the pressure vessel once the vessel is depressurized. Such pressure vessel may include a pipe, a pressurized tank, or any body which may be pressurized and for which access may be needed once the body or vessel is depressurized, such as for cleaning or maintenance. The hub 12 is depicted as being a circular body which has an axially extending depth and a generally hollow interior, defined by an opening, through which access to the pressurized body or vessel is gained. The hub 12 includes an outer peripheral surface 14 and an inner peripheral surface 16. The hub 12 is connected to pressurized body at the rear edge, opposite a head 50. At the forward edge of the hub 12, toward the door 50 in the axial direction, the hub 12 further comprises a plurality of spaced apart hub locking teeth 20. Each tooth 20 comprises a forward tapered surface 22 and a rear, axially inward, tooth surface 24. Between each of the hub locking teeth 20 is a scallop 26. Each scallop 26 has a shape which is complementary of teeth 72 disposed on a locking ring 70 allowing passage of the locking ring teeth 72 between the hub locking teeth 20.

The closure 10 may be closed for operation or opened for maintenance. Extending from the hub 12 is a hinge assembly 30 which allows pivotal rotation of a head 50 from a first open position depicted in FIG. 1 to a second closed position shown, for example, in FIG. 3.

The head 50 is a circular shaped body, which has an outer periphery that fits within the inner diameter of the hub 12 to close the opening 18 defined within the hub 12. The head 50 comprises an axially outermost surface facing away from the hub 12 when the head 50 is closed. The head 50 further comprises an axially innermost surface facing into the hub 12 when the head 50 is closed. The hinge assembly 30 is connected at one end to the hub 12. Distal from the hub 12, the hinge assembly 30 is also connected to the head 50 for movement of the head 50 between the opened and closed positions. Disposed on the head 50 is an actuator assembly 80 which actuates a locking ring 70. When the head 50 is in the closed position, the actuator assembly 80 rotates the locking ring a preselected angle so to align the locking ring teeth 70 with the scallops 26 of the hub 12 allowing the head 50 to be opened or allowing the head 50 to be fully closed. According to the instant embodiment, the preselected angle may be between about 1 and 359 degrees. According to the instant embodiment, the preselected angle is approximately 22.5 degrees although this should not be considered limiting, as various angles may be utilized.

Extending from the hub 12 is the hinge assembly 30. This assembly 30 comprises at least one arm 32 which is connected to a pivot member 36. The pivot member 36 is pivotally connected to the arm 32 by a hinge pin 34. According to the exemplary embodiment, upper and lower arms 32 are utilized and each connects to a first and second end of the pivot member 36. The head 50 is spaced from the hub 12, in FIG. 2, and has a substantially circular shape. The outer surface of the door or head 50, spaced farthest from the hub 12, is substantially flat for mounting of various components, including the actuator assembly 80 described further herein. However, such flat surface is not required and should not be considered limiting. The head 50 comprises a lip 52 adjacent a tapered surface 54. The locking ring 70 is disposed on the tapered surface 54 and seated around the lip 52.

The locking ring 70 is circular in shape, having a hollow center area, and is slidably positioned against the head 50 and about the lip 52 along the tapered surface 54. About the peripheral edge of the locking ring 70 are teeth 72. Each of the teeth 72 has a forward bearing surface or interior surface 76 opposite the head 50 and an adjacent surface 78 near the head 50. Between the teeth 72 are locking ring scallops 74. These scallops 74 receive the teeth 20 along the inner peripheral edge of the hub 12. In the closed position, the surface 76 engages the rear tooth surface 24, inhibiting opening of the head 50.

Also positioned about the inner peripheral edge of the locking ring 70 are lug slots 79 which receive lugs 89. These lugs 89 are rotated by the actuator assembly 80 to rotate the ring 70 such that the teeth 72 may be aligned with scallops 26 or alternatively so that the teeth 72 are disposed behind teeth 20. In the former configuration, the head 50 is locked in a closed position relative to the hub 12.

Mounted along the outer surface of the head 50 is the actuation assembly 80 which comprises at least one actuator 82. According to the exemplary disclosure, a first actuator 82 and a second actuator 84 are utilized to rotate the locking ring 70 through a preselected angle to either lock or unlock the head 50 in a closed position relative to the hub 12. Each actuator 82, 84 comprises a cylinder portion 86 and a piston portion 88 which is extendable or retractable within the cylinder 86. Each of the pistons 88 are connected to a lug 89. The lugs 89 are positioned within the locking ring gaps 79 and the pistons 88 are pivotally connected to the lugs 89 by a fastener. The cylinders 86 are also pivotally connected to the head 50.

Also mounted on the head 50 is a safety lock 90. The lock 90 comprises a cylinder 92 and an extendable piston 94. The extendable piston 94 extends into a safety notch 77 located on the inner periphery of the locking ring 70. This piston 94 is extended into the notch 77 when the locking ring 70 is angularly positioned with the teeth 72 locked or aligned with teeth 20 of the hub. Thus, the locking ring 70 is inhibited from rotating relative to the teeth 20 of the hub 12 so that the head 50 cannot be accidentally opened while the pressure vessel is pressurized.

A plate 40 hides or conceals portions of the components disposed on the outer surface of the head 50. This head plate 40 is connected at one end to the hinge assembly 30 allowing opening and closing of the head by grasping of a handle 44. The plates 40 serve as a means of opening the head 50. The plates 40 also provide safety from the pressurized actuators 82, 84 and lock on the head 50.

On an axially inward surface of the head 50 for seating against the hub 12 is a seal 60 which is fluid energized by the pressurization on the axially inward side of the head 50, when the head is in the closed position and the assembly is in use. The seal 60 inhibits fluid transfer from within the closure to the outer side of the head 50 during operation by being seated within a circumferential groove along the inner side of the head 50. By this structure, a seal is imparted between the head 50 and hub 12. The seal 60 may have an upper portion with radially inward facing groove and is fluid energized with pressure acting on this groove forcing the seal 60 against the head 50. The seal 60 may include a rectangular portion for seating into a circumferential groove about an inner surface of a door. Rapidly inward facing groove provides the fluid energized seal 60 wherein pressure acting on a groove forces the seal 60 against the head 50 and hub 12

Figure 3:
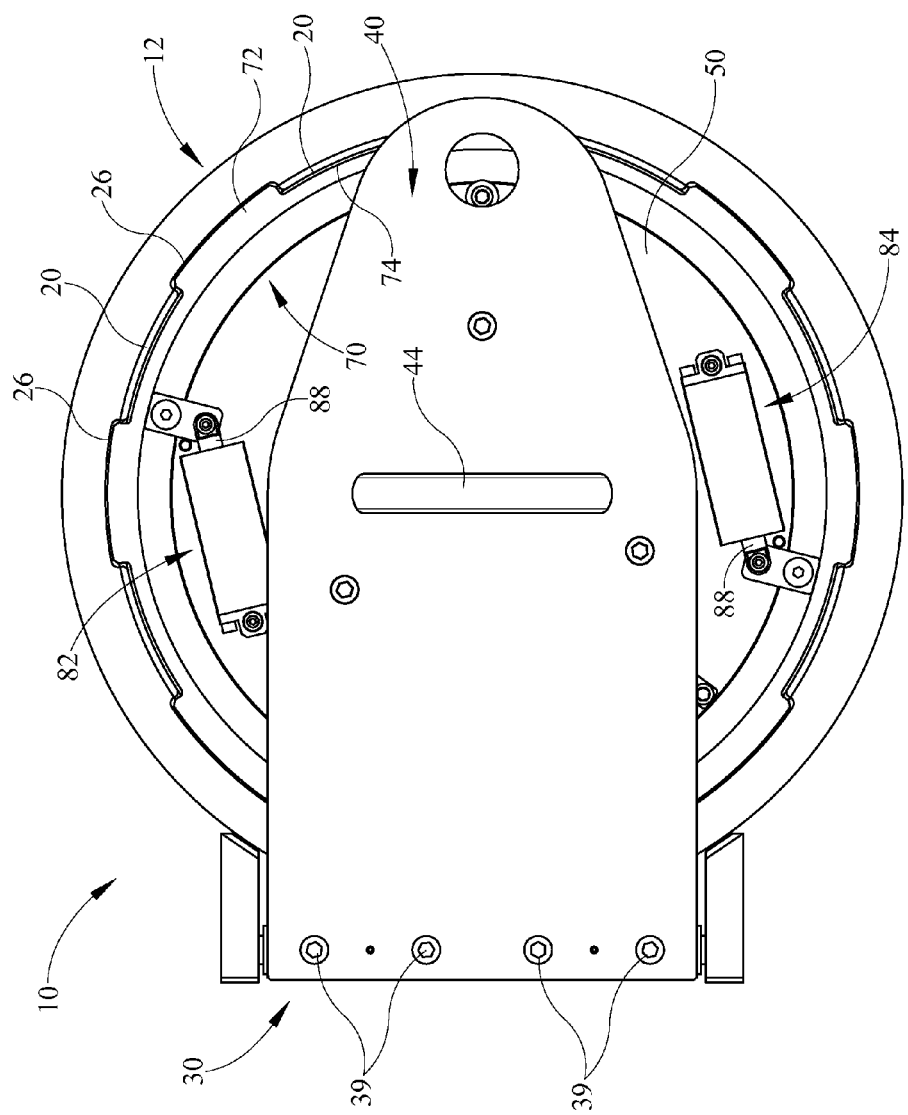
FIG. 3 depicts a front view of an actuated breach lock in an unlocked position.

Referring now to FIG. 3, a front view of the closure 10 is depicted. The Figure depicts the teeth 20 of the hub 12 aligned with the scallops 74 of the locking ring 70. Similarly, the teeth 72 of the locking ring 70 are aligned with the scallops 26 of the hub 12 with the locking ring 70. In this position, the head 50 is moved from its open position shown in FIG. 1 to a closed position but unlocked. In the unlocked position, the actuators 82, 84 are disposed in one of an extended or retracted position. According to the embodiment depicted in FIG. 3, when the locking ring 70 is disposed in an unlocked position, the actuators 82, 84 are retracted.

Figure 4:
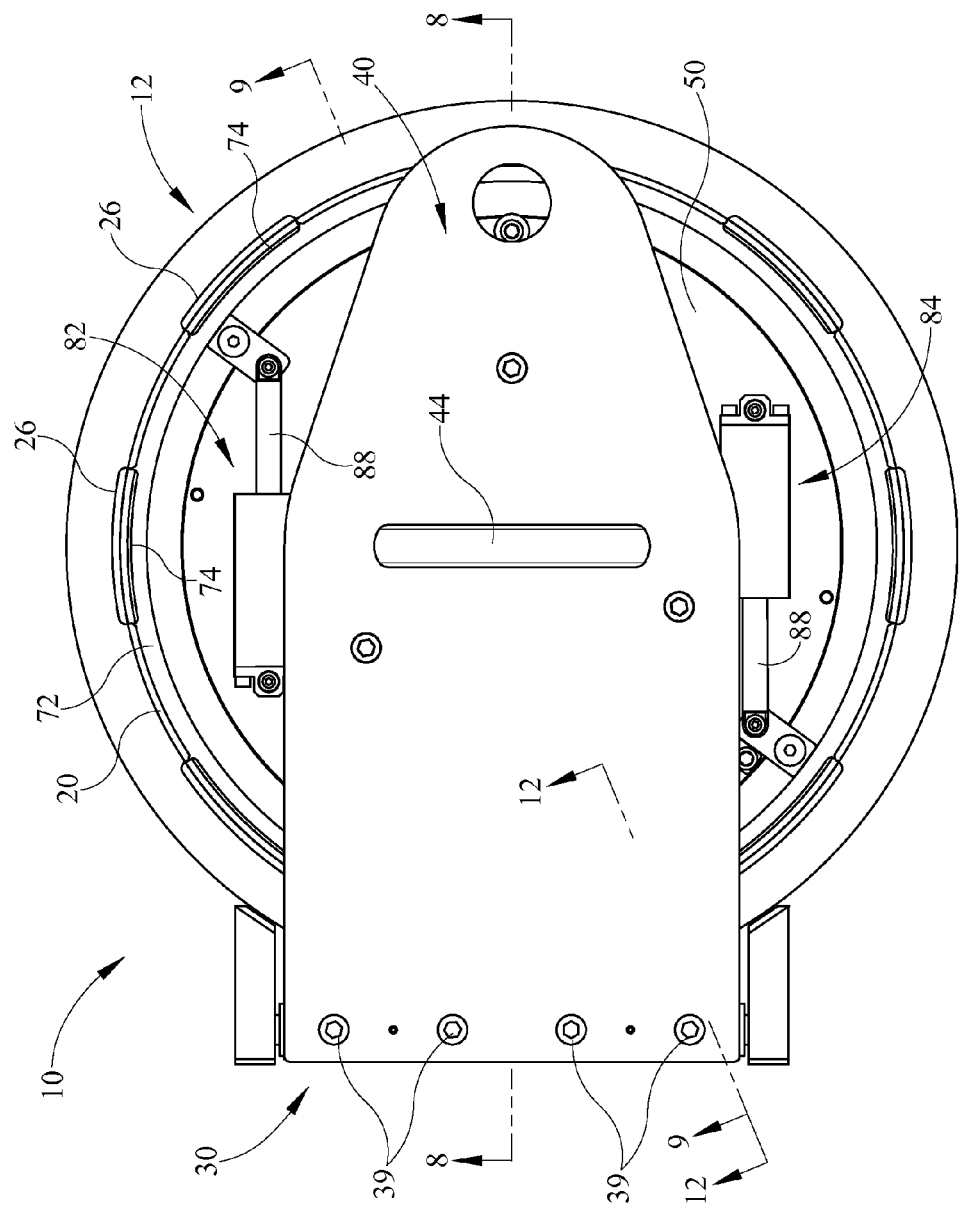
FIG. 4 depicts a front view of an actuated breach lock in a locked position.

Referring now to FIG. 4, a front view of a closure 10 is depicted. The locking ring 70 is rotated a preselected angle from the position shown in FIG. 3 to its new position in FIG. 4. In the depicted position, the locking ring teeth 72 are positioned behind and engaging the hub teeth 20. Additionally, the scallops 26 are circumferentially aligned with the locking ring scallops 74. The positioning of the locking ring 70 in FIG. 4 locks the head 50 closed relative to the hub 12. In order to open the head 50, the locking ring 70 must be rotated to its unlocked position.

In order to achieve the positioning of locking ring 70 in a position depicted in FIG. 4, the first and second actuators 82, 84 are moved from their position determined in FIG. 3. Specifically, the pistons 88 are extended causing rotation of the ring 70 from the position in FIG. 3 to the position depicted in FIG. 4. This causes the head 50 to be locked in the closed position relative to the hub 12. In the locked position shown in FIG. 4, the head 50 cannot be hingeably opened by pulling the handle 44 and pivoting about the hinge assembly 30. Thus, the vessel and closure 10 may be pressurized for operation. It should also be understood that the actuators 82, 84 may be arranged to cause rotation of the locking ring 70 in opposite directions, as opposed to working together in the depicted embodiment. For example, a first actuator rotate the ring in a first direction to lock the head and a second actuator rotating said ring in a second direction to unlock the head. This of course would occur where one actuator extends while the second actuator retracts and vice-versa, as opposed to both extending and retracting at the same time.

Referring to FIG. 5, the locking ring is shown in a front view. As previously described, the locking ring 70 is generally circular in shape having a periphery including a plurality of teeth 72 which are separated by scallops 74. Each of the teeth 72 has a front surface 76 which is tapered and of an angle which is substantially parallel to the rear tooth surface 24 of each tooth 20 along hub 12. More specifically, the surface 76 is defined by a frusto-conical geometry and is substantially equivalent to the frusto-conical geometry of the rear tooth surface 24 insuring uniform contact between the mating surfaces 76 and 24. This allows the locking ring 70 to rotatably slide behind the teeth 20 of the hub 12 and accordingly move between locked and unlocked positions. Disposed at diametrically opposite positions along the locking ring 70 and radially inward of the teeth 72 are lug slots 79. These slots 79 receive the lugs 89 which are pivotally connected to the first and second actuators 82, 84. Also positioned along the inner peripheral edge of the locking ring 70 is a safety notch 77 which receives a piston arm 94 of the safety lock 90. When the piston 94 of lock 90 is seated in the notch 77, the ring 70 cannot rotate. When disengaged, the actuators 82, 84 can rotate the ring 70.

Referring now to FIG. 6, a side section view of the locking ring 70 is depicted which passes through scallops 74. According to the sectioned ends of the locking ring 70, the shape of the locking ring 70 may be described as a polygon. A rear bearing surface 75 of the locking ring 70 is tapered and slidably mates with the tapered head contact surface surface 54 of the head 50. Thus, the rear bearing surface 75 has an angle which is parallel to the head surface 54 which allows for sliding and bearing thereon. Specifically, the surface 75 is defined by a frusto-conical geometry and is substantially equivalent to the frusto-conical geometry of the head surface 54 ensuring uniform contact between the mating surfaces 75 and 54. Also shown are the radially outward portions of adjacent teeth 72 which engage the teeth 20 to lock the head 12 in the closed position.

Referring now to FIG. 7, a second section view of the locking ring 70 is depicted along section line 7, shown in FIG. 5. The section line passes through two opposed ring teeth 72. The front surface 76 of tooth 72 is parallel to the rear bearing surface 75. In this configuration, the two load bearing surfaces of the locking ring 70 are parallel. That is, the front surface 76 of tooth 72 is a load bearing surface and the rear bearing surface 75 is also a load bearing surface. As described further, the parallel load bearing surfaces 75, 76, in part, result in substantial alignment of loads on the locking ring 70, inhibiting movement and bending of ring 70.

Figure 8:
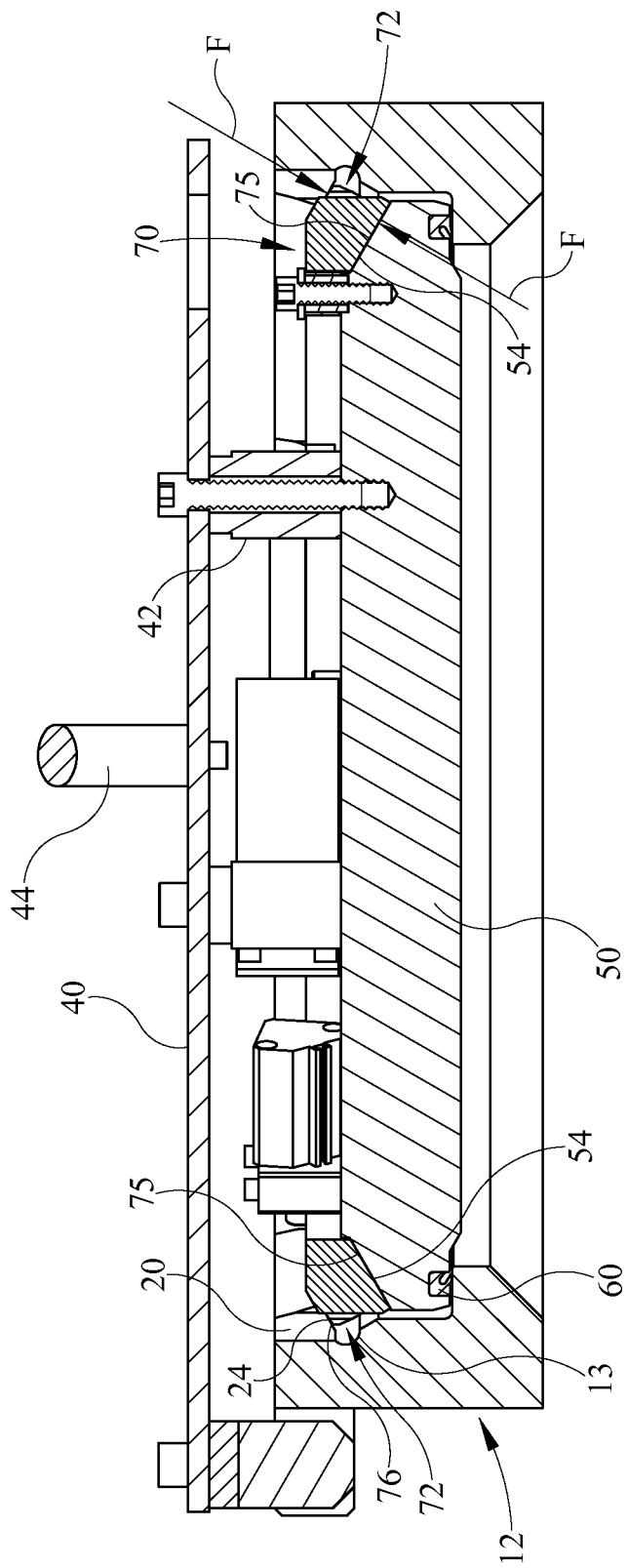
FIG. 8 depicts a cross-sectional view of the actuated breach lock of FIG. 1.

Referring now to FIG. 8, an alternative section view of the closure 10 is depicted in locked position along section line 8, FIG. 5. The section line 8 passes through scallops 26 of hub 12. The locking ring 70 is shown abutting the head 50. Additionally, the tooth 72 of the locking ring 70 is shown engaging the tooth 20 of the hub 12. Specifically, the rear surface 24 of tooth 20 is shown engaging the front surface 76 of tooth 72. The hub 12 further comprises a recess 13 along the inner surface of the hub 12 which allows for positioning of the locking ring tooth 72 therein.

Figure 9:
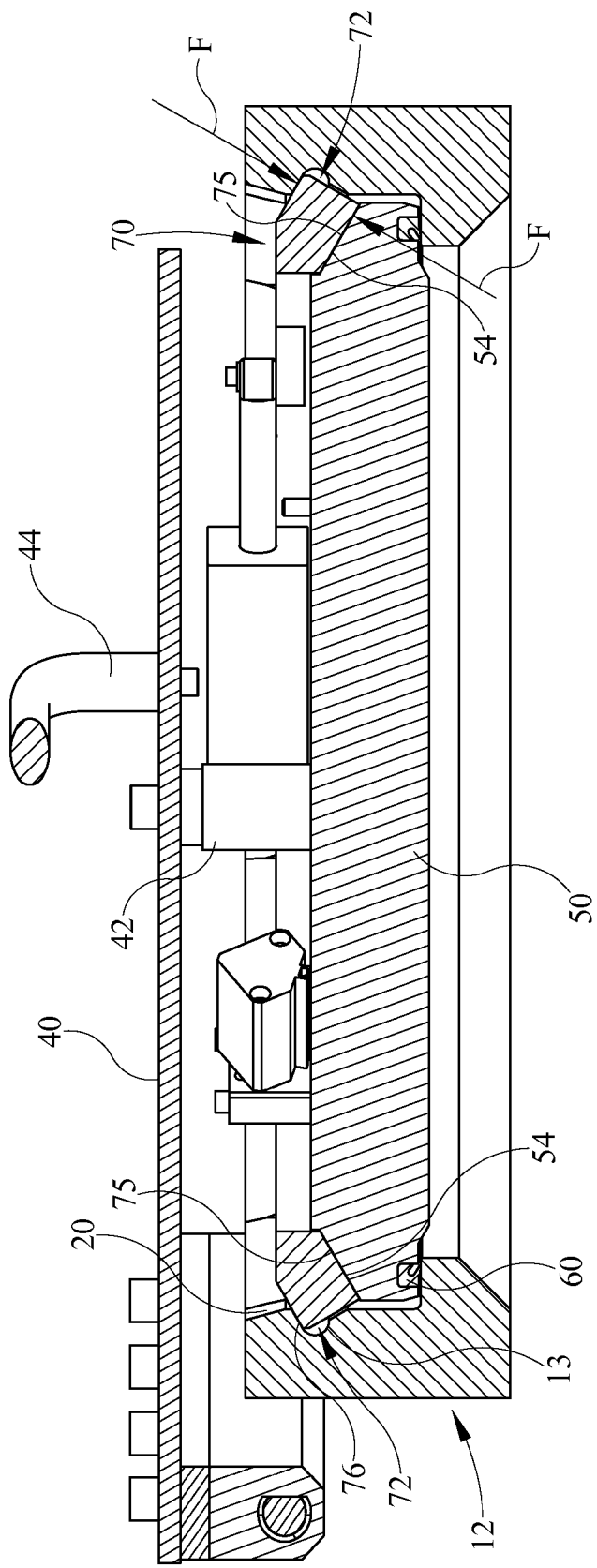
FIG. 9 depicts a second cross-sectional view of the actuated breach lock of FIG. 1.

Referring now to FIG. 9, section view of the closure 10 is depicted with the section line passing through teeth 72 and 20. The locking ring 70 is in compression when the pressure vessel is pressurized. The locking ring 70 is loaded along parallel surfaces 75 and 76. The loading occurs as two equivalent forces equal and opposite acting along the same line of action. In the instant embodiment, the line of action is represented by line F. As a result, due to the equal and opposite forces acting along the single line of action, no moment is generated in the locking ring 70. This allows for a lighter weight part to be designed and utilized for the locking ring structure.

Figure 10:
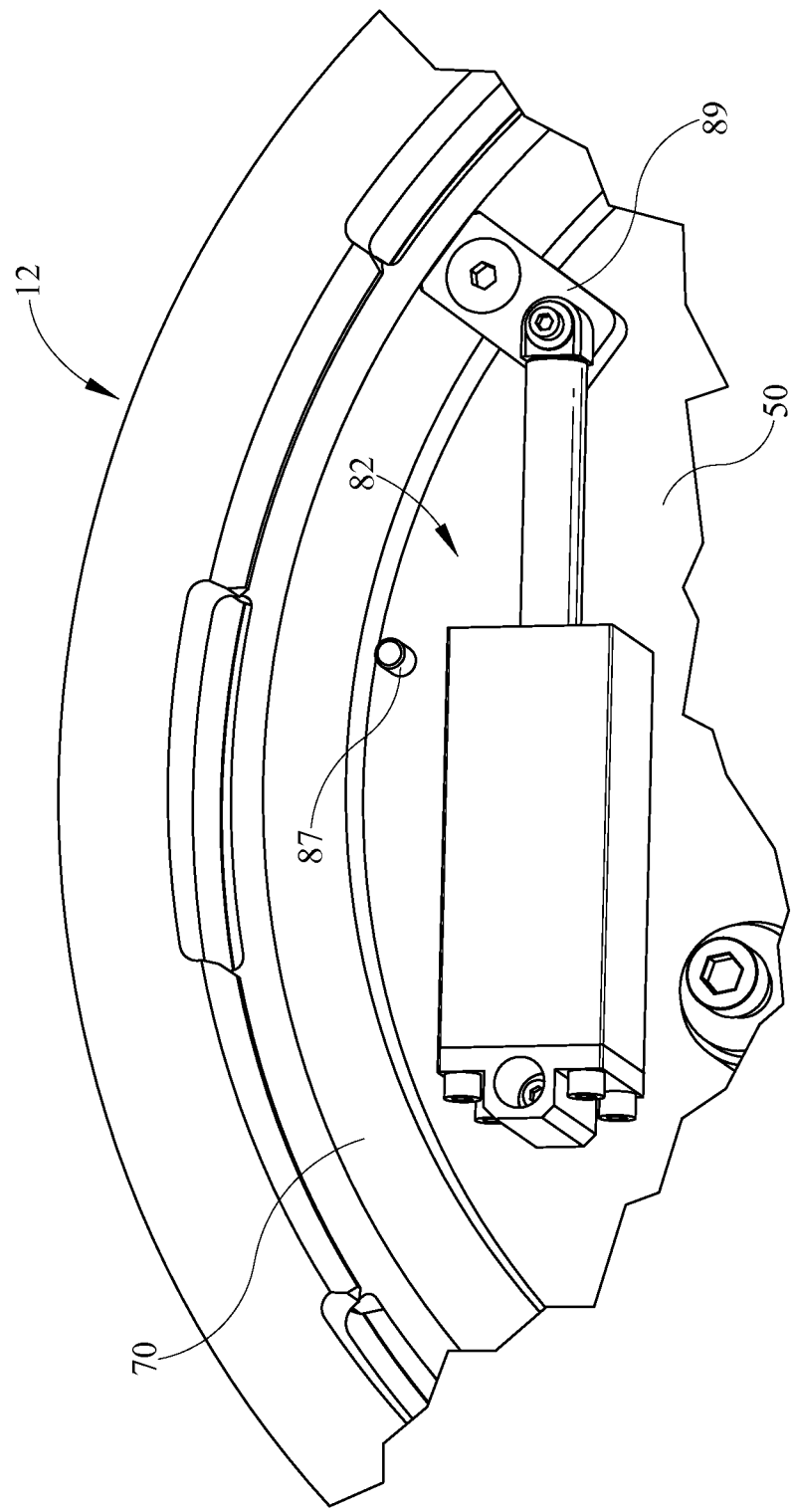
FIG. 10 depicts a detail view of the actuator assembly in a first locked position.
Figure 11:
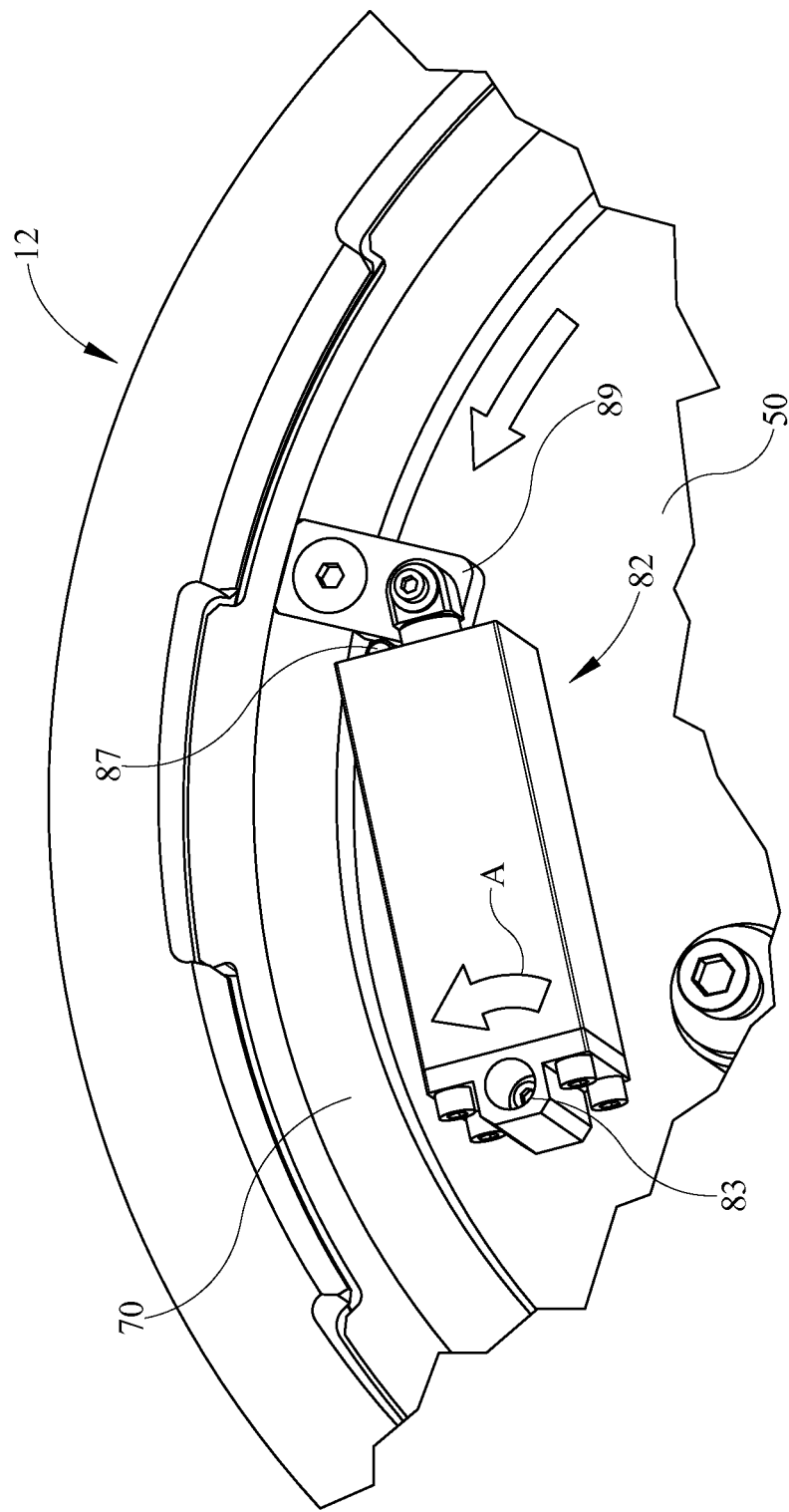
FIG. 11 depicts a detail view of the actuator assembly in a second unlocked position; and, FIG. 12 depicts a cross-sectional view of the exemplary actuated breach lock.

Referring now to FIGS. 10 and 11, detailed perspective views of the actuator assembly 80 are depicted in two positions. First, referring to FIG. 10, for example actuator 82, is shown in an extended position. The actuator 82 is shown in a first orientation extending to the lug 89. According to the instant embodiment, the first orientation is generally horizontal. In comparison with FIG. 11, the actuator 82 is retracted and the locking ring 70 is rotated some preselected angle from the first position shown in FIG. 10. Due to the rotation of the locking ring 70, the lug 89 is translated from the first position shown in FIG. 10 to a second position shown in FIG. 11. In order to remain connected to the stationary head 50 and the moving lug 89, the actuator 82 pivots at a pivot point 83 relative to the head 50 to a second orientation from the first orientation shown in FIG. 10. A large arrow A indicates the location of direction of the actuator 82 caused by the rotation of the locking ring 70. Stops 87 inhibit over-rotation of locking ring 70 by actuators 82, 84.

Figure 12:
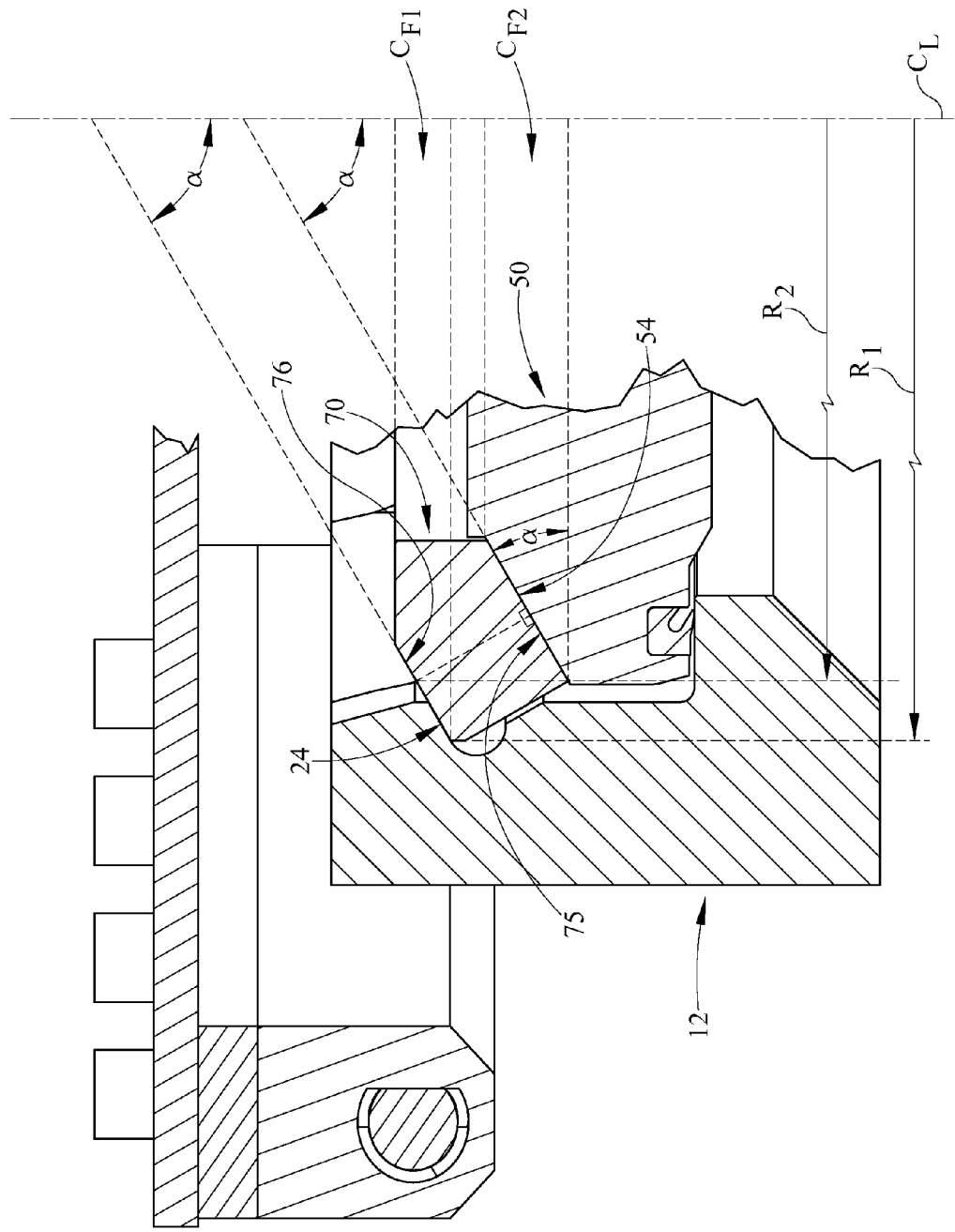

Referring now to FIG. 12, a cross-sectional view of an exemplary closure having the hub 12, the head 50 and the locking ring 70. At the right side of the figure is a centerline $C_L$ about which the locking ring 70 rotates. As previously described the head 50 includes a head contact surface 54 which slidably receives the locking ring 70. The head contact surface 54 is parallel to a tooth front or exterior surface 75 of the locking ring 70. Relative to the centerline $C_L$ the exterior surface 75 and the head contact surface 54 are disposed at an angle α. The exterior surface 75 slides along the head contact surface 54. On the opposite side of the locking ring 70 is a tooth rear or interior surface 76 which is partially positioned in the recess or groove 13 engages the inner tooth surface or hub contact surface 24 to inhibit opening of the head 50. Relative to the centerline $C_L$ about which the locking ring 70 rotates, the interior surface 76 is also disposed at angle α to the centerline. Thus, the exterior and interior surface 75,76 are parallel to one another.

The interior surface of locking ring 76 defines a first conical frustum $C_{F1}$ which extends toward the centerline $C_L$. The exterior surface 75 of the locking ring 70 also defines a second conical frustum $C_{F2}$ which extends toward the centerline $C_L$. The first conical frustum $C_{F1}$ has a first conical radius defined from the centerline $C_L$. The second conical frustum $C_{F2}$ is also defined from the centerline $C_L$. The conical frustums are also indicated in part, for ease of viewing, by broken line projections extending from the conical surfaces toward the centerline $C_L$. According to the exemplary embodiment, the first conical radius $R_1$ is greater than the second conical radius $R_2$. Since the surfaces 75, 76 are parallel, forces between the head 50 and the hub 12 are substantially aligned which inhibits bending of the locking ring. It also results in the locking ring 70 being in compression.

The foregoing description of several embodiments of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

What is claimed is:

1. An actuated breach lock, comprising:
a hub for positioning on a pressurizable vessel, said hub being generally circular and having a central opening, a bearing surface disposed within said central opening;
a head hingedly connected to said hub and having a shape which complements said central opening and which is received within said central opening;
said hub having a plurality of teeth extending radially inward and separated by a plurality of gaps;
a locking ring rotatably positioned on said head, said locking ring having a plurality of ring teeth separated by a plurality of ring gaps, each of said teeth having a circumferential length less than a circumferential length of said gaps in said hub;
said bearing surface of said hub having an angle and said head having a bearing surface at said angle;
said locking ring having a polygonal cross-section including two sides which engage said bearing surfaces respectively, said locking ring engaged by said head and said hub when said head is in a closed position;
said closed position creating a line of force which is aligned from said head through said ring and to said hub;
an actuator assembly disposed radially inwardly of said locking ring, said actuator assembly engaging said locking ring and causing rotation of said locking ring between one of a first locked and unlocked position and the other of the locked and unlocked position;
said locking ring in compression when said head is closed and having said line of force being substantially aligned from said hub through said head.

2. The actuated breach lock of claim 1 said actuator assembly having at least one actuator causing rotation of said locking ring relative to at least one of said head and said hub.

3. The actuated breach lock of claim 2 wherein said at least one actuator comprises a first actuator and a second actuator, each of said first actuator and said second actuator being selected from the group consisting of pneumatic cylinders, hydraulic cylinders, linear actuators and motorized actuators.

4. The actuated breach lock of claim 2, said at least one actuator positioned near said outer surface of said head.

5. The actuated breach lock of claim 1, said locking ring rotated from a first position allowing said ring teeth to pass through said gaps in said hub, to a second position wherein said ring teeth engage said plurality of teeth of said hub.

6. The actuated breach lock of claim 1, said line of force inhibiting moments and bending along said ring.

7. An actuated beach lock, comprising:
a hub for closing and opening of a pressurized vessel;
said hub having a central opening defined by a peripheral rim having circumferential edges, a first plurality of teeth extending radially inwardly from said rim, each of said first teeth separated by a first gap;
a head pivotally connected to said hub for movement between an open position and a closed position;
a polygonally cross-sectionally shaped ring having a first surface and a second surface substantially parallel to said first surface, said first surface of said ring disposed against internal bearing surfaces of said first plurality of teeth of said hub, said second surface of said ring bearing against said head, said ring slidably rotatable about said head within said circumferential edges of said hub;
said ring having a second plurality of teeth each of which fits within said first gap, said second plurality of teeth having one of said first surface and said second surface of said ring;
said internal bearing surface of said hub and an external bearing surface of said head being disposed at parallel angles and a non-perpendicular to the major axis of the head; and,
a line of force being created when said hub and said head is closed and is pressurized and said line of force is substantially aligned through said head, said hub and said ring, said substantially aligned line of force inhibiting creation of bending of said ring.

8. The actuated breach lock of claim 7 further comprising at least one actuator for rotating said ring relative to said head and said hub.

9. The actuated breach lock of claim 7 further comprising a first actuator for rotating said ring in a first direction and a second actuator for rotating said ring in a second direction.

10. The actuated breach lock of claim 9, said first and second actuators disposed on an outer surface of said head.

11. The actuated breach lock of claim 7, said ring compressed between said hub and said head when said head is closed relative to said hub creating said line of force and inhibiting bending on said ring.

12. The actuated breach lock of claim 7 wherein each of said second plurality of teeth on said ring are spaced apart by a second gap, said second gap having a circumferential length which is slightly greater than a circumferential length of said first plurality of teeth of said hub.

13. The actuated breach lock of claim 12, said second plurality teeth of said ring passing through said gaps of said hub, and said ring rotated to lock said head in a closed position within said hub.

14. An actuated breach lock, comprising:
a hub having a peripheral rim and a central opening, an interior bearing surface of said hub disposed at an angle to a major axis of said hub;
a head, pivotally connected to said hub, said head being received by said central opening in said hub, said head further comprising an axially outward facing bearing surface disposed at non-perpendicular angle to said major axis;
said hub having a first plurality of teeth extending radially inward from a peripheral edge, each of said first plurality of teeth spaced apart by a first gap;
a ring rotatably positioned on said bearing surface of said head, said ring having a second plurality of teeth radially extending from a peripheral edge of said ring, each of said second plurality of teeth spaced apart by a second gap,
said ring having at least one first position wherein at least one of said first plurality of teeth is aligned with said second gap and at least one of said second plurality of teeth is aligned with said first gap so that said ring and said head move into or out of said central opening of said hub;

said ring having a first ring bearing surface and a second ring bearing surface, said first ring bearing surface engaging one of said hub interior bearing surface or said head bearing surface and said second ring bearing surface engaging the other of said hub interior bearing surface and said head bearing surface;

said angle of said hub interior bearing surface, said head bearing surface and said first and second ring bearing surfaces allowing for a line of action substantially aligned through said head, said substantially aligned line of action inhibiting bending within said ring.

15. The actuated breach lock of claim 14 further comprising a first actuator and a second actuator.

16. The actuated breach lock of claim 15, said first actuator rotating said ring in a first direction to lock said head and said second actuator rotating said ring in a second direction to unlock said head.

17. The actuated breach lock of claim 16 said first and second actuators being positioned on an external side of said head.

18. The actuated breach lock of claim 14, said ring rotatable along an interior surface of said hub to lock or unlock said head.

19. The actuated breach lock of claim 14, said ring having a polygonal cross-sectional shape.

20. An actuated breach lock, comprising:

a hub defined by a substantially circular body having a central aperture;

a head pivotally connected to said hub and movable from a first position closing said central opening to a second position opening said central opening;

a locking ring disposed on a surface of said head and engaging a groove in said hub when said head is in said first position, said head having a head contact surface which engages said locking ring and said hub having a hub contact surface which engages said locking ring when said head is in said first position;

said locking ring having two contact surfaces, an interior contact surface and an exterior contact surface, said interior contact surface slidably contacting said head contact surface, whereas the exterior contact surface of said locking ring makes contact with said hub contact surface, wherein each of said contact surfaces of said locking ring are geometrically defined as a conical frustum, and further wherein said interior and exterior contact surfaces share a common conical angle and common axis of revolution, an interior contact surface conical radius being less than an exterior contact surface conical radius.

* * * * *